(12) United States Patent
Schmittner et al.

(10) Patent No.: US 9,164,004 B2
(45) Date of Patent: Oct. 20, 2015

(54) HERMETIC WEIGHING CELL HAVING OVERLOAD PROTECTION

(75) Inventors: Arno Schmittner, Rossdorf (DE); Ralf Scherer, Mainz (DE)

(73) Assignee: Hottinger Baldwin Messtechnik GmbH, Darmstadt (DE)

( * ) Notice: Subject to any disclaimer, the term of this patent is extended or adjusted under 35 U.S.C. 154(b) by 98 days.

(21) Appl. No.: 13/639,587

(22) PCT Filed: Apr. 6, 2011

(86) PCT No.: PCT/EP2011/001701
§ 371 (c)(1),
(2), (4) Date: Dec. 14, 2012

(87) PCT Pub. No.: WO2011/124364
PCT Pub. Date: Oct. 13, 2011

(65) Prior Publication Data
US 2013/0074610 A1 Mar. 28, 2013

(30) Foreign Application Priority Data
Apr. 7, 2010 (DE) .......................... 10 2010 014 152

(51) Int. Cl.
*G01L 1/26* (2006.01)
*G01G 3/12* (2006.01)
(Continued)

(52) U.S. Cl.
CPC .. *G01L 1/26* (2013.01); *G01G 3/12* (2013.01); *G01G 21/30* (2013.01); *G01G 23/005* (2013.01)

(58) Field of Classification Search
CPC ....... G01G 3/12; G01G 23/005; G01G 21/30; G01L 1/26
USPC ...................... 73/862.627, 862.631, 862.632, 73/862.636, 862.642, 862.382
See application file for complete search history.

(56) References Cited

U.S. PATENT DOCUMENTS 3,592,054 A * 7/1971 Stewart et al. ............ 73/862.627
3,788,133 A * 1/1974 Paelian et al. .............. 73/862.55
(Continued)

FOREIGN PATENT DOCUMENTS

CN  2 253 469 Y  4/1997
CN  201107105 Y  8/2008
(Continued)

OTHER PUBLICATIONS

German Office Action in German Patent Application No. 10 2008 064 169.3-53, mailed Sep. 10, 2009, 3 pages, with partial English translation, 2 pages.
(Continued)

*Primary Examiner* — Lisa Caputo
*Assistant Examiner* — Philip Cotey
(74) *Attorney, Agent, or Firm* — W. F. Fasse

(57) ABSTRACT

A load cell has a longitudinal body including a bending beam axially between a force input element and a force output element, strain gages applied on strainable measuring parts of the bending beam, a hermetically sealed enclosure outside around the strain gages and the strainable measuring parts, an O-ring and centering pins. An end face of the force input or output element is to be connected to a weighing scale part in an aligned, force-transmitting, hermetically-sealed manner, for which the end face has centering holes receiving the centering pins, a circular groove receiving the O-ring, and a threaded hole receiving a connecting bolt. Further embodiments involve an overload protection integrated in the bending beam, or the enclosure including a stiff pipe sleeve and ring elements with flexible membranes connecting the sleeve to the longitudinal body.

20 Claims, 2 Drawing Sheets

(51) Int. Cl.
*G01G 21/30* (2006.01)
*G01G 23/00* (2006.01)

(56) References Cited

U.S. PATENT DOCUMENTS

| | | | |
|---|---|---|---|
| 3,917,981 A | | 11/1975 | Keen |
| 4,020,686 A | * | 5/1977 | Brendel .................. 177/229 |
| 4,196,784 A | | 4/1980 | Suzuki et al. |
| 4,453,422 A | * | 6/1984 | Yorgiadis ............... 73/862.629 |
| 4,596,155 A | * | 6/1986 | Kistler ................... 73/862.632 |
| 4,619,147 A | | 10/1986 | Yoshimura et al. |
| 4,733,571 A | | 3/1988 | Ormond |
| 4,804,053 A | | 2/1989 | Nordstrom |
| 4,815,547 A | | 3/1989 | Dillon et al. |
| 4,932,253 A | | 6/1990 | McCoy |
| 4,957,177 A | | 9/1990 | Hamilton et al. |
| 5,509,317 A | * | 4/1996 | Gross ..................... 73/862.632 |
| 5,566,575 A | * | 10/1996 | Will et al. ............... 73/862.629 |
| 5,895,894 A | | 4/1999 | Zumbach |
| 6,555,767 B1 | * | 4/2003 | Lockery et al. ........... 177/211 |
| 6,694,829 B2 | | 2/2004 | Chimura et al. |
| 6,789,435 B2 | * | 9/2004 | Hopkins ................. 73/862.632 |
| 7,432,457 B2 | | 10/2008 | Vayhinger et al. |
| 8,153,913 B2 | | 4/2012 | Haefeli et al. |
| 2002/0069708 A1 | | 6/2002 | McKenna |
| 2004/0060372 A1 | | 4/2004 | Hopkins |
| 2007/0007049 A1 | | 1/2007 | Kuchel et al. |
| 2007/0089581 A1 | * | 4/2007 | Sandberg et al. ............ 83/77 |
| 2007/0277621 A1 | | 12/2007 | Schlachter et al. |
| 2012/0061151 A1 | | 3/2012 | Schmittner et al. |

FOREIGN PATENT DOCUMENTS

| | | |
|---|---|---|
| CN | 201210079 Y | 3/2009 |
| CN | 101581600 A | 11/2009 |
| DE | 1 573 896 | 1/1971 |
| DE | 2 117 424 | 10/1972 |
| DE | 28 18 140 | 11/1979 |
| DE | 37 15 572 | 11/1988 |
| DE | 38 24 636 | 1/1990 |
| DE | 102004027619 | 1/2006 |
| DE | 102004047508 | 4/2006 |
| DE | 102008064169 | 6/2010 |
| EP | 0 816 812 | 1/1998 |
| EP | 1 698 871 | 9/2006 |
| EP | 2 120 023 | 11/2009 |
| GB | 1 106 877 | 3/1968 |
| GB | 2 020 440 | 11/1979 |
| GB | 2 150 307 | 6/1985 |
| JP | 59-031026 U | 2/1984 |
| JP | 01-250028 A | 10/1989 |
| JP | 10-339676 A | 12/1998 |
| JP | 2001-099698 A | 4/2001 |
| JP | 2001-343294 A | 12/2001 |
| JP | 2006-349659 A | 12/2006 |

OTHER PUBLICATIONS

Chinese Office Action in Chinese Patent Application No. 200980112921.4, mailed Oct. 29, 2012, 6 pages, with partial English translation, 4 pages.
Partial English translation of Japanese Office Action in Japanese Patent Application No. 2011-541196, mailed Nov. 12, 2013, 5 pages.
International Search Report of the International Searching Authority for International Application PCT/EP2011/001701, mailed Aug. 1, 2011, 2 pages, European Patent Office, HV Rijswijk, Netherlands.
PCT International Preliminary Report on Patentability including English Translation of PCT Written Opinion of the International Searching Authority for International Application PCT/EP2011/001701, issued Oct. 9, 2012, 10 pages, International Bureau of WIPO, Geneva, Switzerland.
Office Action in U.S. Appl. No. 13/141,561, mailed Sep. 13, 2013, 11 pages.
German Office Action in German Application No. 10 2010 014 152.6-53, dated Jan. 12, 2011, 4 pages, Muenchen, Germany, with partial English translation, 4 pages.
US Office Action in U.S. Appl. No. 13/141,561, mailed Jun. 24, 2014, 8 pages.
Office Action in U.S. Appl. No. 13/141,561, mailed Mar. 3, 2015, 9 pages.
Chinese Search Report (2 pages) from Chinese Office Action mailed Jun. 4, 2014 in Chinese Patent Application No. 201010510746.9, with English translation (2 pages), Chinese counterpart of U.S. Appl. No. 13/639,587.
English translation (2 pages) of Japanese Office Action mailed Sep. 17, 2014 in Japanese Patent Application No. 2011-541196, Japanese counterpart of U.S. Appl. No. 13/141,561.
English translation (human-prepared) of Japanese Patent Application Publication 2001-099698A, published Apr. 13, 2001.

* cited by examiner

HERMETIC WEIGHING CELL HAVING OVERLOAD PROTECTION

CROSS-REFERENCE TO RELATED APPLICATION

This application is related to U.S. application Ser. No. 13/141,561, which is a US National Stage Application under 35 USC 371 of PCT International Application PCT/EP2009/009004 filed on Dec. 16, 2009.

FIELD OF THE INVENTION

The invention relates to a load cell of the bending beam type, preferably for an aseptic platform scale, and having a sealed enclosure as well as a sealed mounting connection.

Load cells are special cases of the force transducers or pick ups, and are provided for the construction of weighing devices. Such weighing devices are often also used in the supply of foodstuffs, so that they often must satisfy special hygiene regulations. Therefore, it is also necessary for the load cells used in those applications, that these are constructed so that no dirt and no foodstuff residues can permanently collect on their surfaces, or at least must be easily removable. Furthermore, there are often horizontal surfaces, gaps and depressions on such load cells, which are hardly accessible and therefore can only be cleaned with difficulty, where then bacteria, viruses and fungi easily deposit and take hold. Therefore, in the use of load cells in many areas of the chemical, pharmaceutical, cosmetic, and foodstuff industries, it is necessary that these are easy to clean and if possible have no surface areas on which dirt, foodstuff residues, chemicals, bacteria, viruses and fungi can become deposited and take hold, penetrate, or build-up.

A hermetically sealed measured value pick-up or transducer, which represents a load cell, is known from the DE 10 2004 047 508 B3, which is embodied as a horizontally installable bending beam. This bending beam consists of a force introduction or input part and a force output part, between which a force measuring element is arranged. In that regard, the force measuring element consists of a vertical bending spring, which was produced by two oppositely directed horizontal transverse bored holes in the middle bending beam part, and on which strain gages are applied on both sides as shear force pick-ups or transducers, which produce a proportional electrical signal in connection with a weight loading. For the hermetic sealing in that regard, pot-shaped metallic sheet metal parts are welded into the bored holes, and hermetically tightly enclose the sensitive electrical measuring elements. Thereby it is primarily prevented, that moisture and other corrosive dirt particles come into contact with the sensitive measuring elements, so that a load cell having a long life is produced. While this load cell is rod shaped and equipped with largely flat exterior surfaces, whereby however foodstuff or liquid residues can deposit especially on the horizontally extending cover surface, and these residues in connection with moisture tend to cause an increase or multiplication of bacteria or viruses. Moreover, dirt and foodstuff components could also adhere in the pot-shaped depressions, which may only be cleaned with difficulty, and in which fungi and bacteria could form. Therefore, even such a hermetically sealed load cell is often not usable in aseptic areas or fields according to the applicable hygiene regulations.

From the DE 37 15 572 A1, a load cell for an electromechanical platform scale is known, which essentially consists of a cylindrical round rod, from which at least flowable foodstuffs and liquids would run-off by means of gravity. In that regard, one side of the bending rod is secured by means of two screws on the scale housing, while the opposite end as a flattened round rod is connected with the weighing platform, whereby the weight force is introducible transversely to the longitudinal direction. However, in this load cell, the strain gages may be applied on the surface of the bending rod for producing the electrical measurement signals, so that such a load cell cannot be cleaned with watery or aqueous cleaning agents, and therefore is not always usable in the foodstuff industry or in aseptic areas or fields.

A further load cell with cylinder-shaped horizontally arranged housing is known from the DE 28 18 140 A1, which is to be completely protected with respect to foreign influences. In that regard, a horizontal round rod is arranged in the housing body, and is secured at its one end region in a free carrying pipe. On the outer circumferential surface of the free carrying pipe, strain gages are applied, which pick-up and measure a strain on the outer circumferential surface of the pipe in connection with a vertical force introduction into the end point of the rod. In that regard, the free carrying pipe is hermetically tightly enclosed by a cylinder-shaped enclosure sleeve as a housing part. However, the force introduction is carried out via a threaded bolt in a chamber that is open at least toward the bottom, and in which a force introduction eye grasps around the rod, which is movably guided in this open chamber. Because this chamber is not hermetically enclosed, dirt and liquid residues can penetrate therein and are hardly removable, so that this load cell is not usable in contact with foodstuffs.

An installation or mounting set for a load cell is previously known from the EP 1 698 871 A1, and is especially usable in the area or field of the chemical and pharmaceutical, the foodstuff and cosmetic industry. In that regard, this installation or mounting set includes a vertically arranged load cell, which is arranged between two parallel horizontally arranged mounting plates. Apparently, two round compression parts are provided as force introduction or input and force output elements, between which the load cell is arranged. In that regard, the load cell is arranged enclosed in a round conically extending housing, which engages into the compression parts or encompasses these so that this installation or mounting set is well cleanable and apparently has few gaps and hollow spaces in which bacteria, viruses and fungi could form. However, hereby the compression parts as force introduction or force output elements are only loosely connected with the load cell, so that such a load cell can only be installed vertically and also cannot be connected securely with the scale, so that another installation or mounting set will always additionally be necessary.

SUMMARY OF THE INVENTION

Therefore it is an object of an embodiment of the invention to further develop a hermetically sealed load cell so that it is easily cleanable and includes no gaps, depressions and horizontal surface parts in and on which residues, dirt, bacteria, viruses or fungi can be deposited or multiplied, so that it is also usable in an aseptic environment, especially in equipment for foodstuff processing.

The above objects can be achieved by a load cell arrangement according to an embodiment of the invention as set forth herein, comprising a longitudinal body, strain gages, a hermetically sealed enclosure, an O-ring and at least two centering pins. The longitudinal body extends along a longitudinal axis and comprises a force input element, a force output element, and a bending beam. The bending beam is arranged axially between and connected to the force input element and the force output element. The bending beam includes strainable measuring parts, and is arranged and configured so that a force to be measured, which is applied perpendicularly to the longitudinal axis onto the force input element, will cause bending of the bending beam and therewith a measurable strain in the strainable measuring parts. The strain gages are applied on the strainable measuring parts of the bending beam so as to measure the measurable strain. The hermetically sealed enclosure comprises a pipe sleeve arranged coaxially along the longitudinal axis, and is arranged outwardly around and encloses the strainable measuring parts and the strain gages on the strainable measuring parts. An end face of the force input element or of the force output element is to be connected to a weighing scale part in a hermetically-sealed and force-transmitting manner with limited play therebetween. For this, the end face has at least one threaded hole and at least two centering holes therein with the holes respectively extending axially parallel to the longitudinal axis, the end face has a first circular groove therein concentrically around the longitudinal axis and outwardly around the holes, the first O-ring is received in the first circular groove, and the centering pins are received in the centering holes. Furthermore, the end face, the holes, the centering pins and the first O-ring are configured and arranged so that the end face is to be connected to the weighing scale part by at least one threaded bolt engaged into the at least one threaded hole, whereby the first O-ring provides a seal between the end face and the weighing scale part, and the centering pins provide a centered alignment with limited play between the end face and the weighing scale part.

The above objects can further be achieved by a load cell according to another embodiment of the invention as set forth herein. Such a load cell is embodied rod-shaped and comprises a force measuring element arranged axially between a force introduction element and a force output element. The force measuring element comprises a bending beam including measuring spring parts that have strain gages applied thereon and that are hermetically tightly enclosed by a hermetically sealed metal enclosure. A force to be measured is to be introduced perpendicularly to a longitudinal axis of the load cell. The metal enclosure comprises a pipe sleeve and two ring elements. The pipe sleeve is arranged coaxially outwardly around the bending beam which is arranged inside and enclosed within the pipe sleeve. The ring elements extend along planes perpendicular to the longitudinal axis and connect and hermetically seal the pipe sleeve to the bending beam and the force introduction element and the force output element. At least one threaded bored hole is provided extending axially parallel to the longitudinal axis respectively in at least one end face of at least one of the force introduction element and the force output element for securing the load cell to a weighing platform or a scale frame as a securing part. Unthreaded centering holes are provided extending axially parallel to the longitudinal axis at respective defined locations of the end face. The centering holes are surrounded by at least one groove coaxially around the longitudinal axis, into which at least one O-ring is laid for sealing a securing gap between the end face and the securing part.

An embodiment of the invention has the advantage that due to the horizontal installation position it also comprises only vertically declining surface parts, so that all foodstuffs, cosmetics or pharmaceutical components coming in contact therewith can only be deposited with difficulty, whereby a formation of fungi, viruses or bacteria is largely prevented. Due to the welded encapsulation of the load cell, this is also well cleanable and disinfectable with watery or aqueous solutions, so that such load cells advantageously can also be used in the aseptic area or field.

Due to an integrated overload protection, a further embodiment of the invention additionally has the advantage, that hereby neither the structural volume of the load cell is increased, nor unencapsulated parts of the overload device protrude to the outside in a manner that is sensitive to soiling. In that regard, the overload protection additionally has the advantage that it substantially can be produced from the monolithic force measuring element by a milling and boring process of the bending beam base body that is to be produced, in a simple manner preferably with a program controlled machine tool, so that merely the freely obtainable fitting pins are still insertable. This embodiment of the invention simultaneously has the advantage that the production of the overload protection also requires no additional installation time and no manual adjustment work. Because such fitting pins are obtainable as cost-economical mass produced parts in high accuracy classes, advantageously the very small gap widths can be produced very accurately with simple machining processes, so that the inventive overload protection protects the strain gage very reliably against arising overloads.

Through the fitting pins arranged transversely to the longitudinal direction, it is advantageously simultaneously achieved that the overload protection is uniformly effective over the entire width of the force measuring element, so that especially a turning or rotation of the bending beam about the longitudinal axis in connection with an off-center force introduction is prevented.

In a particular embodiment of the invention it is provided to use two fitting pins for limiting or bounding the movable bending beam part in both vertical directions, whereby advantageously an overload protection in the tension and compression direction is simultaneously achievable, which protects the strain gages against overloading in both possible motion directions of the force element.

In a further particular embodiment of the invention it is provided to seal it by simple O-ring seals relative to the mounting or securing parts thereof and to center it by centering pins, which has the advantage that neither germs nor the smallest dirt particles can penetrate even on the securing or mounting surfaces, without this leading to an unstable bearing support or twisting or rotation on the connection surfaces. In that regard, especially an O-ring seal arranged on the outer circumference of the force introduction or force output element has the advantage, that even during the cleaning no germ-forming liquid can penetrate by capillary action into the gap between the securing surfaces.

Simultaneously the centering has the advantage that the floating support of the connecting surfaces is exactly fixable with mass produced securing screws and at least two simple centering pins, without the force direction deviating from the measuring direction. With such a sealing and centering, advantageously both the force introduction as well as the force uptake element can be sealed relative to its securing or mounting parts.

In a further particular embodiment of the invention it is provided to embody the force measuring element as a double bending beam with which very high measuring accuracies are advantageously achievable. Therefore, also scales that must be calibrated are advantageously producible with such load cells.

In a different particular embodiment, the entire load cell consists of a high strength, high grade stainless steel so that such a load cell can be used even with high humidity and aggressive environmental influences, and thus represents a very long-lived embodiment and which also is not attacked by most chemicals or pharmaceutical raw materials. Thereby it is especially advantageous, to taper the closed ring elements circumferentially in such a manner so that they form membranes, whereby advantageously a measuring element arises that is encapsulated all around, and that comprises outwardly flat or smooth rounded surfaces that are well cleanable, without exerting a significant force shunt effect on the actual measuring element. Whereby simultaneously a high measuring accuracy is also ensured.

Through the special nearly cylindrical embodiment of the force introduction and force output elements, advantageously an embodiment is achieved that can be used in flat platform scales. Thereby the force introduction and force output elements are equipped with parallel vertical centered and sealed securing surfaces, so that they advantageously allow a well-drained tightly-sealed vertical securing.

In a further special embodiment it is additionally still provided, to provide the load cell with a protective layer, which comprises a surface with difficult adhesion, so that friable or flowable or liquid materials that come in contact therewith will flow off without leaving behind residues, and so that a germ formation especially of illness germs is prevented even without any mentionable cleaning measures.

BRIEF DESCRIPTION OF THE DRAWINGS

The invention will be explained in further detail in connection with an example embodiment, which is illustrated in the drawing. It is shown by.

DETAILED DESCRIPTION OF EXAMPLE EMBODIMENTS OF THE INVENTION

Figure 1:
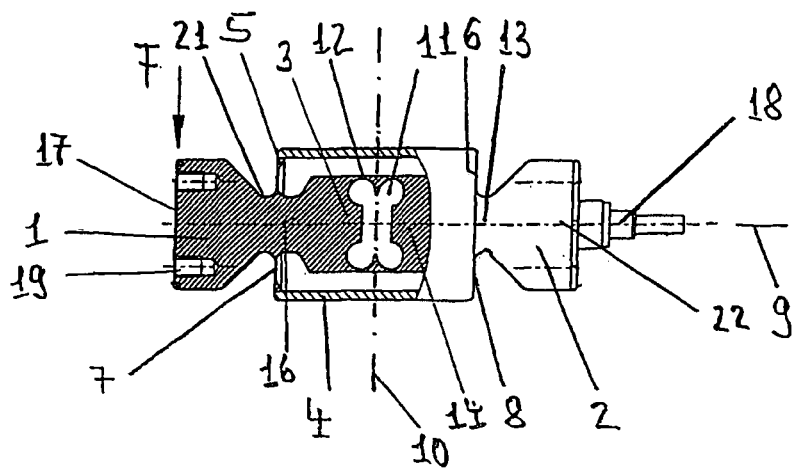
FIG. 1: a hermetically sealed load cell according to the abovementioned related application with vertical securing surfaces.

In FIG. 1 of the drawing, a hermetically sealed load cell according to the main application is shown, which is embodied rotationally symmetrically, whereby a double bending beam 3 is arranged in the longitudinal direction between the force introduction element 1 and force output element 2, which double bending beam 3 is enclosed by two ring elements 5, 6 provided at its end regions, and a pipe sleeve 4 that is welded therewith, whereby the ring elements 5, 6 include concentrically encircling thin locations as membranes 7, 8, which connect the pipe sleeve in a flexurally or bendably soft manner with the force introduction element 1 and the force output element 2 and the double bending beam 3.

The load cell basically consists of a central longitudinal body, from which the force introduction element 1, the force output element 2, the double bending beam 3 and the two ring elements 5, 6 are machined. Thereby, the longitudinal body preferably consists of a high-value, high-grade flexurally elastic stainless steel, over which the pipe sleeve 4 is tipped in the finished condition and is welded in an airtight manner with the two ring elements 5, 6. For a load cell with a 10 kg rated load, the central longitudinal body is preferably 120 mm long and approximately 40 mm in diameter. The double bending beam 3 is arranged between the force introduction element 1 and the force output element 2, and includes a parallelepiped block shaped middle part 14. A horizontal cut-out recess 11 is provided in the middle part 14 symmetrically to a longitudinal axis 9 and a transverse axis 10, whereby the recess 11 comprises a clover leaf type cross-section due to four horizontal bored holes. Thereby, webs 12 embodied as bending springs or forming so-called measuring spring parts or strainable measuring parts arise on the two parallel horizontal cover surfaces of the middle part 14, and preferably eight strain gages are applied on webs 12, whereby under a vertical force loading, i.e. input weight force F applied perpendicularly to the longitudinal axis 9, the strain gages produce an electrical signal that is proportional to the introduced weight force F.

Two tapering round connecting pieces 13, 16 are applied or mounted on the two ends of the middle part 14, which pieces connect the double bending beam 3 on one side with the force introduction element 1 and on the opposite side with the force output element 2. Approximately in the middle of each axial connecting piece 13, 16, respectively one ring element 5, 6 is applied or mounted transversely to the longitudinal axis 9, wherein the outer diameter of the ring element corresponds to the inner diameter of the pipe sleeve 4 and is larger than the diameter of the force introduction element 1 and of the force output element 2, and preferably amounts to approximately 39 mm. The two ring elements 5, 6 are concentrically tapered in a concave manner on the annular ring surface facing toward the double bending beam 3, and thereby form a concentrically encircling first membrane 7 and second membrane 8, of which the thickness preferably amounts to 0.3 mm.

The round connecting pieces 13 and 16 preferably comprise a diameter of 16 mm. The force introduction element 1 and the force output element 2 are respectively arranged in the axial direction laterally next to and connected to the first connecting piece 16 and the second connecting piece 13 respectively. From there, the force introduction element 1 and the force output element 2 both expand outwardly conically to preferably a 38 mm diameter through an encircling circumferential groove 21, in order to then transition into a cylindrical form of approximately 16 mm length, which then ends in a flat end face 17 as a vertical securing surface. Thereby, both the force introduction element 1 as well as the force output element 2 are identically embodied in their external shape, and are both arranged symmetrically to the longitudinal axis 9 and transverse axis 10. In the force output element 2, in the longitudinal direction, a central longitudinal bored hole 22 is still provided, which extends at least to the recess 11, and in which the connection lines for the strain gages are guided. Therefore, a connecting cable 18 is still further secured in a sealed manner in the force output element 2, in which connecting cable the connecting lines are guided to the outside in a sealed manner.

For securing the load cells on a scale frame, two horizontal threaded bored holes 19 are still further applied on the end face 17 of the force output element 2, and for the securing of a weighing platform two same-type threaded bored holes 19 are provided similarly on the end face of the force introduction element 1. Thereby the two parallel end faces 17 represent vertical securing surfaces, so that such load cells are usable not only for platform scales but also for any other weighing devices in which the weight force F is introduced perpendicularly to the longitudinal axis 9 into the end face 17 of the load cell.

After the application and wire-connection of the strain gages, the double bending beam is hermetically enclosed by means of a pipe sleeve 4 that is slid over it, by welding the pipe sleeve with the ring elements 5, 6. In that regard, the pipe sleeve 4 also preferably consists of a high-strength high-grade stainless steel. The length of the pipe sleeve 4 corresponds to the spacing distance between the two ring elements 5 and 6, with the radial outer edges of which the pipe sleeve is welded in an airtight manner. In that regard, the pipe sleeve 4 is embodied flexurally stiff, whereby the outer circumferential surface thereof comprises only a small prescribed roughness, which is preferably producible by an electro-polishing, so that this has a surface that allows good running-off drainage and is easy to clean.

Figure 2:
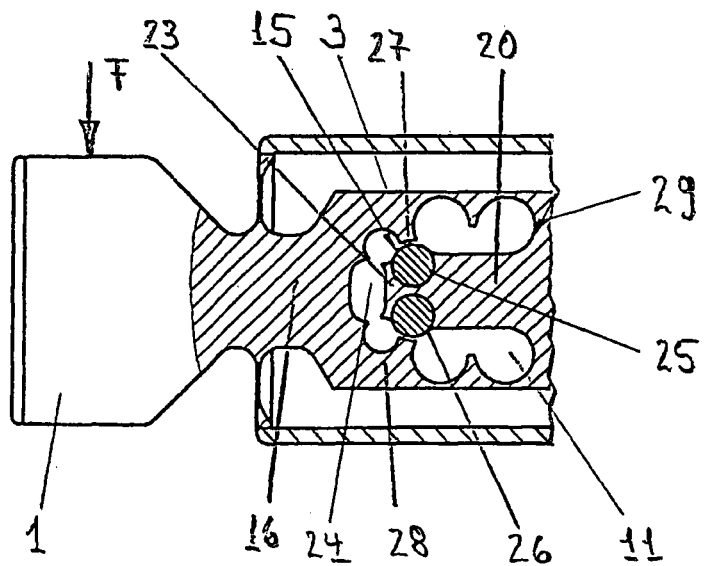
FIG. 2: a hermetically sealed load cell with internally located overload protection.

In FIG. 2 of the drawing, a part of a hermetically sealed load cell according to FIG. 1 of the drawing is illustrated with a sectional illustration of an internally located overload protection 15, which comprises an overload beam 20 with a contact stop head 23 within the double bending beam 3, which contact stop head reaches into an expanded or widened recess 24 at the end 28 of the bending beam 3 toward the force introduction element 1, whereby two horizontal bored holes 25 are also introduced into the contact stop head 23 toward the expanded recess 24, into which horizontal bored holes respectively a fitting pin 26 is fixed in such a manner so that its outer circumferential surface leaves a defined gap 27 remaining for contacting against the movable part of the bending beam 3.

For preventing an overloading and damaging of the sensitive strain gages, often in load cells an overload protection is provided, which limits the movable part of the load cell at least in the measuring direction. For that purpose, usually stationary limiting elements are provided in the outer movement range of the bending beam 3, whereby the limiting elements often are still embodied to be exactly adjustable due to the small deflection distances.

Because an externally round closed load cell is involved here, on which no dirt particles and germs shall adhere, an external overload protection was disadvantageous. Therefore, the overload protection 15 was integrated in the recess 11 of the double bending beam 3, so that the overload protection 15 is arranged within the hermetically sealed area. For that, an axial horizontal overload beam 20 is arranged in the recess 11 of the double bending beam 3, and the overload beam is connected with the stationary rigid end 29 of the double bending beam 3 on its force output side. On the other movable end 28 of the double bending beam 3, additionally a widened or expanded recess 24 is provided, which is preferably introduced into the monolithic middle part 14 of the bending beam 3 by six horizontal transverse bored holes.

The overload beam 20 protrudes with its contact stop head 23 into this expanded recess 24. In that regard, two parallel horizontal bored holes 25 are introduced one over another in the contact stop head 23 and in the movable end 28 of the bending beam 3, whereby the cross section of the horizontal bored holes is arranged with more than half)(>180° in the contact stop head 23 and with a remainder)(<180° in the movable end 28 of the bending beam 3. Respectively one fitting pin 26 is slid or pressed horizontally at the top and at the bottom into the two cross section areas of the bored holes 25 of the contact stop head 23 for the purpose of fixing, whereby the fitting pins are vertically fixed by their cross section of more than one half in the bore hole parts of the contact stop head 23. In that regard, each bored hole part 25 is produced in a manner enlarged by the limiting path distance toward the movable part of the bending zs beam 3, so that a defined gap 27 is provided there, which serves for limiting the deflection of the bending beam 3 relative to the rigid overload beam 20. Because such fitting pins 26 are obtainable as mass produced parts with high accuracies, such an overload protection 15 is not only very accurately producible, but also still cost-economical. Because vertical movements of only 0.05 to 0.15 mm are provided for such double bending beams 3, prescribed gap widths of 0.1 to 0.5 mm are usually sufficient for the limiting.

Such an overload protection 15 is also usable for simple one-sided bending beams. Basically the contact stop head 23 could also reach into the rigid force output part 2 of the bending beam 3, if the overload beam 20 was secured on the movable part of the bending beam 28. The double bending beam 3 equipped with two fitting pins 26 arranged parallel transversely to the longitudinal direction is designed for an overload in measuring direction (compression) as well as in the opposite direction (tension). If only the overload in the measuring direction is to be limited, then an embodiment with only one upper fitting pin 26 is also sufficient.

Figure 3:
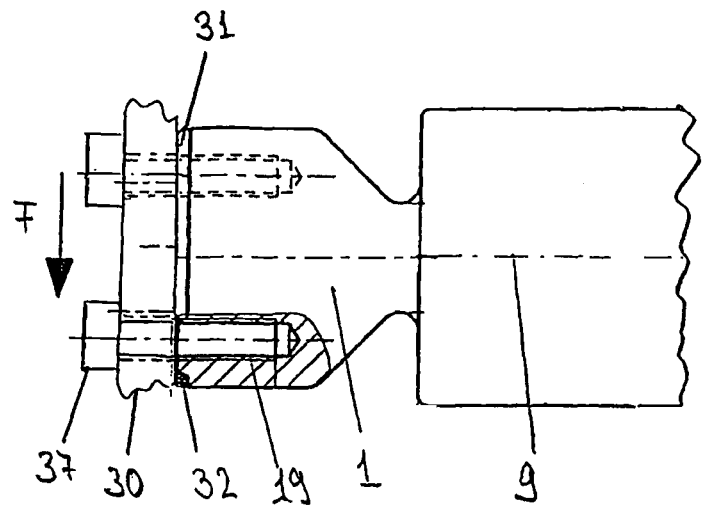
FIG. 3: a side view of a force introduction element of the load cell with centered and sealed securing part of a weighing platform.
Figure 4:
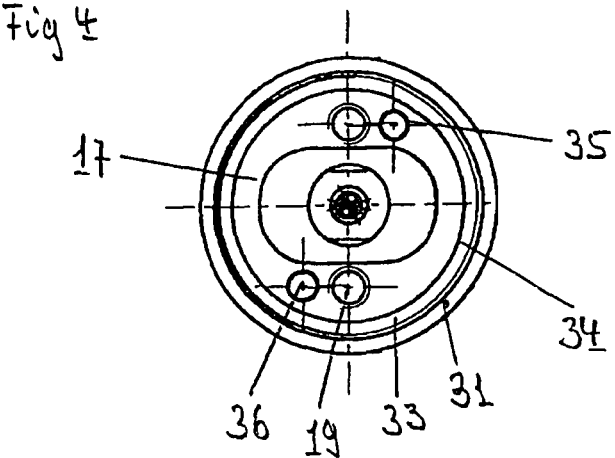
FIG. 4: a front view of a centerable and sealable force introduction element.
Figure 5:
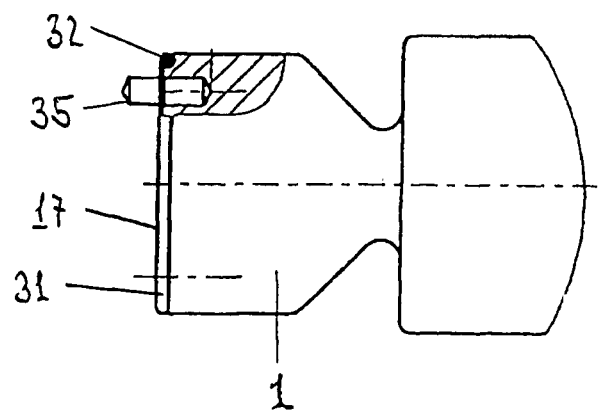
FIG. 5: a side view of the force introduction element with sectional view of a centering pin.

For improving the sealing relative to adhering dirt and germ particles and simultaneously for improving the measuring accuracy, a centered and sealed force introduction element 1 is illustrated in FIGS. 3 to 5 of the drawing, and preferably a securing or mounting part 30 of a weighing platform is arranged on the force introduction element 1 for force introduction. Because such a hermetically sealed load cell is preferably used for an aseptic application, it is often sensible that no dust-type soiling and germ particles can get between the securing gaps. However, due to such a sealing, the measuring accuracy shall not become worse.

For this purpose, for better sealing between the securing or mounting part 30 and the end face 17 of the force introduction element 1, a coaxial outer groove 31 is milled into the outer rim of the end face 17. An O-ring 32 is laid into this groove for the outer sealing between the outer surface of the securing part 30 and the rim area of the end face 17, by which a hermetic seal is achieved, so that neither germs nor dirt particles can get between these contact surfaces.

For carrying out the sealing, the securing or mounting part 30 is tightly screwed together with the force introduction element 1 by means of one or more securing screws 37, so that the outer surfaces of the securing part 30 lie tightly on the outer O-ring 32. Because basically a floating support arises through the sealing with the elastic O-ring 32 between the end face 17 and the outer surface of the securing element 30, which can lead to a directional or orientation error of the force introduction and force measuring direction due to an unavoidable play of the securing screws 37 and a possible twisting or rotation or a different or varying loading on the weighing platform, additionally at least two centering bored holes 36 are provided within the end face 17 surrounded by the outer O-ring 32. As schematically indicated in FIGS. 4 and 5, the centering holes 36 for receiving centering pins 35 may be unthreaded bored holes, in comparison to the holes 19 that are threaded in order to be engaged by the threaded securing bolts or screws 37. Two highly exact centering pins 35 are fitted into these centering bored holes 36, so that the force introduction direction F always extends in the measuring direction. In that regard, the centering bored holes 36 are preferably provided on the circumferential circle of the securing screws 37 and at an angular spacing therefrom of preferably 30°. With higher weight force loading more than two centering pins 35 can also be used, which comprise at most a play of 0.01 to 0.03 mm in the centering bored holes 36 of the force introduction element 1 and of the securing part 30.

For further improving the sealing between the securing part 30 and the end face 17, additionally still a second coaxial inner groove 33 is introduced into the force introduction element, which similarly surrounds the securing screws 37 and the centering pins 35, and which achieves a wider seal surface in connection with a screw connection or securing. Such a sealing and centering is preferably also provided on the force output element 2, so that this is also hermetically sealed relative to its rigid securing parts. Insofar as the load cell is only loaded with smaller forces below the nominal rated load, it can also be used with only the centered and sealed force introduction and/or force uptake element without the overload protection 15.

Through the illustrated covering of the flat securing surfaces 17 by securing elements of the weighing device, all embodiments have only downwardly sloping rounded surfaces on which friable or flowable or liquid goods can run off downwardly. Because the entire surfaces of the load cell preferably are embodied with only a small or low roughness, and comprise no undercut and no tight gaps, friable or flowable goods or liquids can hardly adhere thereon. In a further embodiment it is still further provided to provide the load cell additionally with a difficult adhering surface coating, such as, e.g. polytetrafluoroethylene (Teflon), whereby an adhesion is additionally prevented and the cleaning possibility is improved. Therefore such load cells are preferably usable in the foodstuff supply, whereby any germ formation especially of the illness germs or their multiplication must be prevented.

Due to the production of the load cells of high-grade stainless steel and the encapsulation of the double bending beam by the welding of the pipe sleeve 4 with the high-grade stainless steel ring elements 5, 6, a penetration of germ-forming substances is absolutely prevented, so that such load cells are also usable in aseptic areas or fields. Thereby, especially through the two membranes 7, 8 on the annular ring surfaces, a decoupling of the introduced weight force F is achieved, so that nearly no force shunt coupling to the flexurally stiff pipe sleeve 4 arises, so that a high measurement accuracy is achievable. Therefore, also highly exact, calibrateable scales can also be produced with such load cells.

The invention claimed is:

1. A load cell arrangement comprising:
a longitudinal body that extends along a longitudinal axis and that comprises a force input element, a force output element, and a bending beam, wherein said bending beam is arranged axially between and connected to said force input element and said force output element, wherein said bending beam includes strainable measuring parts, and wherein said bending beam is arranged and configured so that a force to be measured, which is applied perpendicularly to said longitudinal axis onto said force input element, will cause bending of the bending beam and therewith a measurable strain in said strainable measuring parts;
strain gages applied on said strainable measuring parts of said bending beam so as to measure said measurable strain;
a hermetically sealed enclosure that comprises a pipe sleeve arranged coaxially along said longitudinal axis, and that is arranged outwardly around and encloses said strainable measuring parts and said strain gages on said strainable measuring parts;
a first O-ring; and
at least two centering pins;
wherein an end face of said force input element or of said force output element is to be connected to a weighing scale part in a hermetically-sealed and force-transmitting manner with limited play therebetween, said end face has at least one threaded hole and at least two centering holes therein with said holes respectively extending axially parallel to said longitudinal axis, said end face has a first circular groove therein concentrically around said longitudinal axis and outwardly around said holes, said first O-ring is received in said first circular groove, and said centering pins are received in said centering holes, and
wherein said end face, said holes, said centering pins and said first O-ring are configured and arranged so that said end face is to be connected to the weighing scale part by at least one threaded bolt engaged into said at least one threaded hole, whereby said first O-ring provides a seal between said end face and the weighing scale part, and said centering pins provide a centered alignment with limited play between said end face and the weighing scale part.

2. The load cell arrangement according to claim 1, wherein said hermetically sealed enclosure further comprises two ring elements, wherein each one of said ring elements respectively comprises a respective membrane that is more flexible than said pipe sleeve, said ring elements are each respectively connected to and protrude radially outwardly from said longitudinal body, said ring elements are connected to and support said pipe sleeve relative to and spaced radially away from said longitudinal body with said membranes interposed between said pipe sleeve and said longitudinal body, and said pipe sleeve has a cylindrical outer surface parallel to and coaxial about said longitudinal axis.

3. The load cell arrangement according to claim 1, wherein all outer surfaces of said load cell arrangement except for said end faces of said force input element and of said force output element are curved rotationally symmetrically around said longitudinal axis.

4. The load cell arrangement according to claim 1, wherein said end faces of said force input element and of said force output element are respective flat planar surfaces extending perpendicularly to said longitudinal axis.

5. The load cell arrangement according to claim 1, further comprising a second O-ring, and wherein said end face further has a second circular groove therein concentrically around said longitudinal axis and outwardly around said holes and said first circular groove, and wherein said second O-ring is received in said second circular groove.

6. The load cell arrangement according to claim 5, wherein said second circular groove is provided at an outer rim of said end face adjoining a radially outer surface of said force input element or of said force output element having said end face, so that said second circular groove is open axially away from said end face and radially outwardly, and said second O-ring is exposed radially outwardly from said load cell arrangement around said longitudinal axis.

7. The load cell arrangement according to claim 1, wherein said centering pins received in said centering holes allow less play, in a direction perpendicular to or around said longitudinal axis, than the at least one threaded bolt engaged in said at least one threaded hole.

8. The load cell arrangement according to claim 1, wherein said centering pins are fitted with a play of at most 0.03 mm in said centering holes.

9. The load cell arrangement according to claim 1, wherein said centering holes and said at least one threaded hole are each located on a single common circle around said longitudinal axis.

10. The load cell arrangement according to claim 9, wherein said centering holes are located circumferentially offset from said at least one threaded hole by an angle of 30° around said longitudinal axis.

11. The load cell arrangement according to claim 1, wherein said at least one threaded hole includes two threaded holes located diametrically opposite one another at a first radius from said longitudinal axis, and said two centering holes are located diametrically opposite one another at a second radius from said longitudinal axis that is different from said first radius.

12. The load cell arrangement according to claim 11, wherein said two centering holes are circumferentially offset from said two threaded holes around said longitudinal axis.

13. A load cell, which is embodied rod-shaped and comprises a force introduction element and a force output element and a force measuring element arranged axially therebetween, wherein the force measuring element comprises a bending beam including measuring spring parts that have strain gages applied thereon and that are hermetically tightly enclosed by a hermetically sealed metal enclosure, wherein a force to be measured is to be introduced perpendicularly to a longitudinal axis of the load cell, wherein the metal enclosure comprises a pipe sleeve and two ring elements, wherein the pipe sleeve is arranged coaxially outwardly around the bending beam which is arranged inside and enclosed within the pipe sleeve, wherein the ring elements extend along planes perpendicular to the longitudinal axis and connect and hermetically seal the pipe sleeve to the bending beam and the force introduction element and the force output element, wherein at least one threaded bored hole is provided extending axially parallel to the longitudinal axis respectively in at least one end face of at least one of the force introduction element and the force output element for securing the load cell to a weighing platform or a scale frame as a securing part, wherein unthreaded centering holes are provided extending axially parallel to the longitudinal axis at respective defined locations of the end face, and wherein the centering holes are surrounded by at least one groove on the end face coaxially around the longitudinal axis, into which at least one groove at least one O-ring is laid for sealing a securing gap between the end face and the securing part.

14. The load cell according to claim 13, wherein the at least one groove comprises a radially outer groove arranged on a radially outer rim of the end face and a radially inner groove arranged coaxially thereto on a radially inwardly lying surface of the end face.

15. The load cell according to claim 13, further comprising a first connecting piece between the force introduction element and the bending beam, and a second connecting piece between the force output element and the bending beam, wherein the force introduction element, the first connecting piece with the first ring element arranged thereon, the bending beam, the second connecting piece with the second ring element arranged thereon, and the force output element are all together embodied as one piece.

16. The load cell according to claim 13, wherein the ring elements are disc-shaped about the longitudinal axis and are concentrically tapered on at least one concentrically encircling annular ring surface thereof so that they each respectively form a flexible membrane.

17. The load cell according to claim 16, wherein the annular ring surface of each ring element that is oriented facing inwardly toward the bending beam respectively has a concave encircling depression, and wherein the annular ring surface of each ring element oriented facing outwardly away from the bending beam is respectively planar.

18. The load cell according to claim 13, wherein the outer surface of the load cell except for the end faces comprises only smooth rounded surface parts.

19. The load cell according to claim 13, wherein the force introduction element, the force measuring element and the force output element have an outer surface shape that is cylindrical and coaxial around the longitudinal axis.

20. The load cell according to claim 13, wherein radially outer edges of the ring elements are respectively welded to respective opposite axial ends of the pipe sleeve to close and hermetically seal the metal enclosure.

* * * * *